(12) United States Patent  
Hars

(10) Patent No.: US 7,356,551 B2
(45) Date of Patent: Apr. 8, 2008

(54) METHOD AND APPARATUS OF RETAINING MAXIMUM SPEED OF FLIP-FLOP METASTABILITY BASED RANDOM NUMBER GENERATORS

(75) Inventor: Laszlo Hars, Cranberry Township, PA (US)

(73) Assignee: NXP B.V., Eindhoven (NL)

( * ) Notice: Subject to any disclaimer, the term of this patent is extended or adjusted under 35 U.S.C. 154(b) by 928 days.

(21) Appl. No.: 10/801,808

(22) Filed: Mar. 15, 2004

(65) Prior Publication Data

US 2005/0004961 A1    Jan. 6, 2005

Related U.S. Application Data

(60) Provisional application No. 60/454,835, filed on Mar. 14, 2003.

(51) Int. Cl.
*G06F 1/02* (2006.01)
(52) U.S. Cl. .................. 708/250; 708/251; 708/252; 708/253; 708/255; 708/256
(58) Field of Classification Search ......... 708/250–256
See application file for complete search history.

(56) References Cited

U.S. PATENT DOCUMENTS

| | | | | |
|---|---|---|---|---|
| 3,947,697 A | * | 3/1976 | Archer et al. | 327/154 |
| 4,929,850 A | * | 5/1990 | Breuninger | 327/198 |
| 5,343,414 A | * | 8/1994 | Asghar et al. | 708/309 |
| 6,631,390 B1 | * | 10/2003 | Epstein | 708/250 |

* cited by examiner

*Primary Examiner*—Meng-Al T. An
*Assistant Examiner*—Michael Yaary

(57) ABSTRACT

An apparatus, system and method for retaining the maximum speed of flip-flop metastability based random number generators includes a fixed delay unit having an input for receiving a common signal from a digital signal generator, and a variable delay unit having an input also for receiving the common signal from the digital signal generator. Each of the delay units is attached to the input of a respective logic gate. A frequency measurement of the occurrences of metastability, which is the speed of the random bit generation and delay tuning module 312 receives an output of one of the first NAND gates, checks the frequency of random number bit generation and updates the variable delay unit to according to predetermined criteria to tune the delay so as to maximize the speed of the random bit generation. An algorithm is used to determine whether the optimum delay is equal to, smaller or larger than the delay used to achieve the measured frequency.

19 Claims, 2 Drawing Sheets

METHOD AND APPARATUS OF RETAINING MAXIMUM SPEED OF FLIP-FLOP METASTABILITY BASED RANDOM NUMBER GENERATORS

This application claims priority to provisional patent application Ser. No. 60/454,835 filed Mar. 14, 2003.

FIELD OF THE INVENTION

The present invention relates to use of metastable states of flip-flops as a basis for random number generation. More particularly, the present invention relates to a method and apparatus for keeping the speed of random number generators utilizing metastability of flip-flops at a maximum.

BACKGROUND ART

It is known that when the hold and setup times of flip-flops (such as D-type flip-flops) are violated, the flip-flop often enters a metastable state. Metastability can also occur when both inputs to a latch are either both 00 or 11.

Metastability can cause the latch outputs to oscillate unpredictably in a statistically known manner. While theoretically it is possible for the latch outputs to oscillate in a statistically known manner, in reality the latch will randomly shift and arrive at random output values. Such metastable values are then detected by other circuitry as different logic states.

Previous work by the instant inventor has focused on using the unpredictability, or randomness, of the metastable flip-flop, to provide a true random number generator.

FIG. 1 illustrates a random number generator comprising a latch 150 having two cross-connected NAND gates 110 and 115. The flip-flop 105 receives its clock pulse from clock oscillator 112, and the inverted output (−Q) is fed back to the D input, shaping the clock signal to square wave. The non-inverted output (Q) is then fed to delay devices 113, 114, respectively. Each of the delay devices has an output directly in series with one of the NAND gates, 110,115.

If the composition of the two NAND Gates 110,115 were exactly the same, there would be no need for the delay devices to achieve the highest frequency to get flip-flop 150 to become metastable. However, the NAND gates will ordinarily differ somewhat, and their differences (gain, offset, speed . . . ) will influence their metastability.

In addition, the difference between the NAND gates changes with temperature, supply voltage and possible environmental factors, so for the highest frequency at which the flip-flop gets metastable, one of the delays has to be tuned dynamically in very small steps. If the flip-flop gets metastable, the output signal is random. However, although the output is random, it is usually not even at a standard logic level.

FIG. 2 shows a string of conventional cascaded flip-flops 205,210,215. We know from this prior art arrangement that even these few cascaded flip-flops ensures with a very high probability that the output is in a 0 or 1 level. If the input to D in flip-flop 205 should come from a metastable flip-flop, the output of this detector is sufficiently random.

However, when one measures the random number generation speed, it is often unknown whether the optimum delay is equal to, smaller or larger than the actual delay. Thus, a complex algorithm is needed to find the highest speed and keep the circuit at this point.

With regard to FIG. 1, it is easy to see that one of the delay elements 113, 114 can be fixed to produce a signal delay equal to the median of the delay range necessary to keep the speed at a maximum. The other delay element is enough to be variable within the delay range so as to provide a large number of different delay values (typically 16-256), and can be selected by suitable codes (e.g. a binary multiplexer). However, in order to maximize such a system, there is a need for a method that dynamically tunes the delay to keep the random number generator at maximum speed.

SUMMARY OF THE INVENTION

The present invention is directed to a method and apparatus and system that tracks the frequency of the occurrences of metastability and makes adjustments to optimize the value of one of the delay devices. Thus, the random number generator is kept at an optimum speed by the dynamic tuning of one of the delay devices as environmental factors change. A module measures the speed of the random bit generation and dynamically tunes one of the delay units according to an algorithm.

DETAILED EMBODIMENTS

Figure 1:
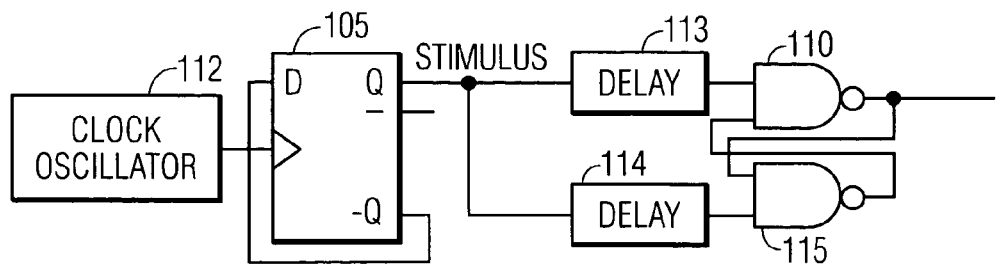
FIG. 1 is a prior art illustration featuring a randomness source for a random number generator.
Figure 2:
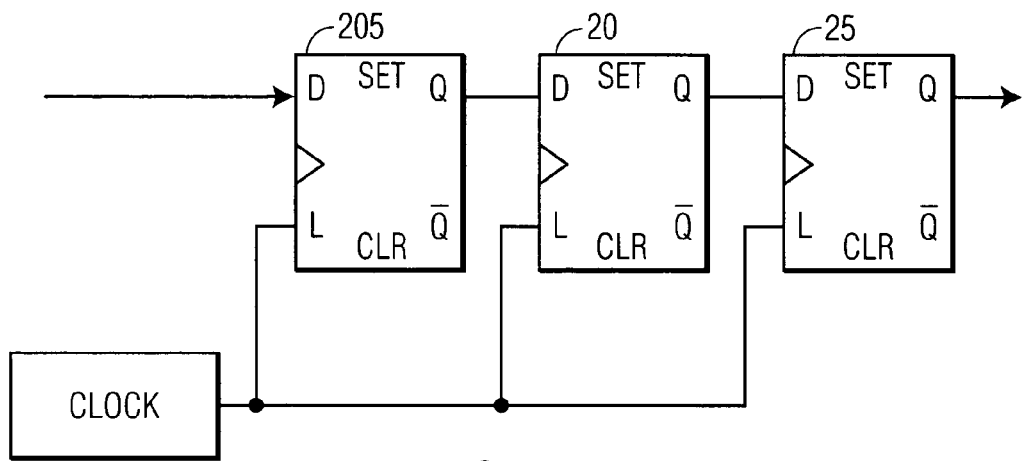
FIG. 2 is a prior art illustration of cascaded flip-flops that, with very high probability produce stable output at metastable inputs.
Figure 3:
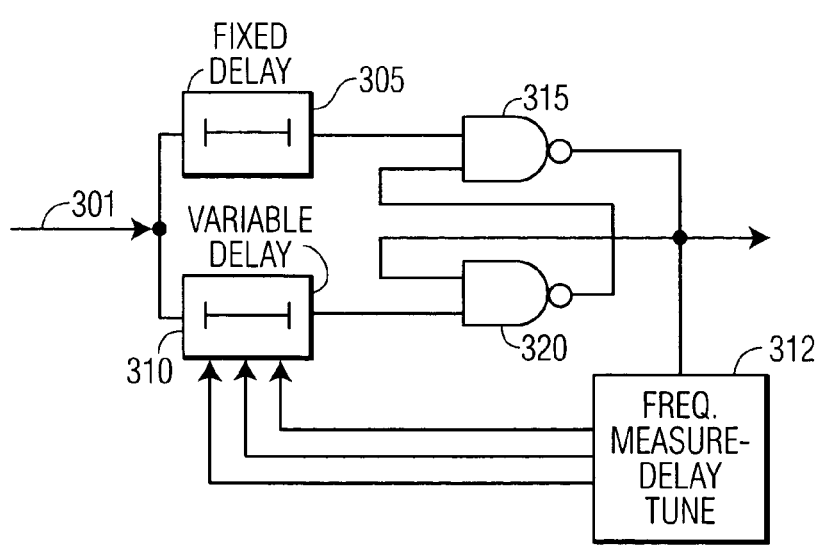
FIG. 3 is an illustration of the present method.

FIG. 3 shows an illustration of an apparatus according to the instant invention. It should be understood that there are various modifications that a person of ordinary skill in the art could make that do not depart from the spirit of the invention or the scope of the appended claims.

The input 301 would be from a square wave source. The metastability, as previously discussed, can be caused by, for example, violating setup and hold times of a flip-flop or applying forbidden input combination to a dual input latch so as to create the metastable output of the circuit at 330. The input 301 is fed to both a fixed delay unit 305 and a variable delay unit 310. The outputs of the respective delay units are fed to an input of respective NAND gates 315, 320. Whereas the output of NAND gate 320 is fed to an input of NAND gate 315, the output of NAND gate 315 is fed to an input of NAND gate 320 and it is provided to a frequency measurement-, delay tuning-module 312. The delay of the delay element 310 is dynamically tuned affecting the input signal of NAND gate 320. The module 312 monitors the output 330 to determine the frequency how often the flip-flop formed by the NAND gates 315 and 320 gets metastable and dynamically tunes the variable delay unit 312 to maximize it to optimize the speed of the random number generator utilizing the signal 330.

There are many ways known in the art, how random numbers can be generated from the random occurrences of metastability seen at the output of the circle at 330. These include the final logic value to which the metastable circuit resolves to, the time point at which the metastability occurs, the length of the metastable event, etc.

Although the present inventor recommends as a best mode that the fixed delay be set to perform a signal delay equal to the center of the delay range necessary to keep maximum speed, it is clearly within the spirit and scope of the invention that the fixed delay could be set at other values, which in turn, would require the variable delay unit 310 to be set at different values.

With regard to the frequency measurement delay tuning module 312, a microprocessor is best applied for the speed measurements of the random bit generation and for the delay tune algorithm. However, the functions of module 312 can also be provided for by implementing specially designed hardware.

For example, the frequency measurement can be performed with a counter, which is multiplied by a weight (<1) at every clock cycle and incremented by 1 each time a random bit is produced. The following C code is provided merely for purposes of illustration and not for limitation as one way that the apparatus can operate. It should be understood that other ways or different types of code could be used:

define Weight 0.9990234375//1−1/(2<<10)

Counter=Counter*Weight+IsRandomBitGenerated();

Thus, the current floating point value of the counter is related to the speed of the random bit generation during the last clock cycles. With the above constant it is a few thousand clocks. The multiplication with the weight can be replaced by periodically shifting an integer counter one bit to the right (Divide by 2). It should be understood, that the frequency measurement of the occurrences of metastability can be done by any other dynamic frequency measurement algorithm (having a finite or infinite length integrator) known in the art.

The variable delay element is varied according to a certain schedule. Enough time has to be provided between successive changes of the delay, such that the generation speed can be reliably determined. Here is described one possible delay schedule algorithm that is considered the best mode, but there are many other possible algorithms that could be used.

The delay values and the corresponding speed during the last K (a hundred or so) different delay settings are stored and updated with the measured speed from each new delay setting.

The delay changes in the schedule are relative from the stored optimum delay value. A pseudo-random sequence of Gaussian-like distribution is used. Small delay changes in each direction are often used, with larger increments being less and less likely to be applied. This keeps the delay around its ever-changing optimum value with occasional experiments of further away values. If these changes are successful, the center of subsequent changes moves there. If a delay change is unsuccessful (resulting in slower generation of random bits) it will be forgotten, with the next adjustment of the delay being from the previous optimum.

The scheduling algorithm needs to store the last K measured generation-speed values in a queue (ring-buffer, for example) in such a manner that, the current maximum is always available. A heap or priority queue data structure can perform quite efficiently for this purpose.

The following algorithm in MATLAB code is provided as one way that a delay scheduling algorithm may look. A computer readable medium may contain this code, or it could be loaded, for example, into a microprocessor. However, an artisan understands that there can be other algorithms, either written in MATLAB or other languages within the spirit of the invention and the scope of the appended claims that perform these functions. An artisan also understand that the following has REMARKS following the "%" symbol to help the reader understand what is happening in the algorithm.

```
qlen = 100;   % Queue length
dmax = 256; % #delay values
dsig = sqrt(dmax);   % standard deviation of steps
speed = zeros(1, qlen); % start with speed 0
delay = zeros(1, qlen) + dmax/2;   % start with median delay
i = 1; % insertion point in the queue
while 1 % infinite loop to keep max speed
dstep = randn*dsig;   % steps of normal distribution
dstep = sign(dstep)*ceil(abs(dstep)); % ensure |step| > 0
[smx, imx] = max(speed); % last max and its index in queue
dmx = delay(imx);
dly = max(1, min(256, dmx + dstep)); % next try
spd = GetSpeed(dly); % set delay, get speed
delay(i) = dly; % store trial results
speed(i) = spd;
i = i + 1;   % move insertion point in queue
if i > qlen, i = 1; end
end.
```

One interpretation of the above code as a series of sub-steps is as follows:
(i) setting a queue length at a predetermined value;
(ii) (ii) setting a predetermined number of delay values;
(iii) designating a standard deviation (dmax) of steps;
(iv) starting with speed of 0;
(v) starting with a median delay;
(vi) setting an insertion point in the queue while keeping an infinite loop at maximum speed;
(vii) designating a number of steps of normal distribution;
(viii) ensuring that |step|>0;
(ix) obtaining a last maximum speed and its index in the queue;
(x) setting the delay as imax;
(xi) repeating for next next delay value (from 1 to 256);
(xii) setting delay (dly) and getting speed (spd);
(xiii) storing trial results of speed and updating a variable delay unit used for random number generation;
(xiv) moving/increasing insertion point i in the queue by 1;
(xv) if the insertion point i>que length, and i=1, then ending the routine;
(xvi) go to step (xi).

Figure 4:
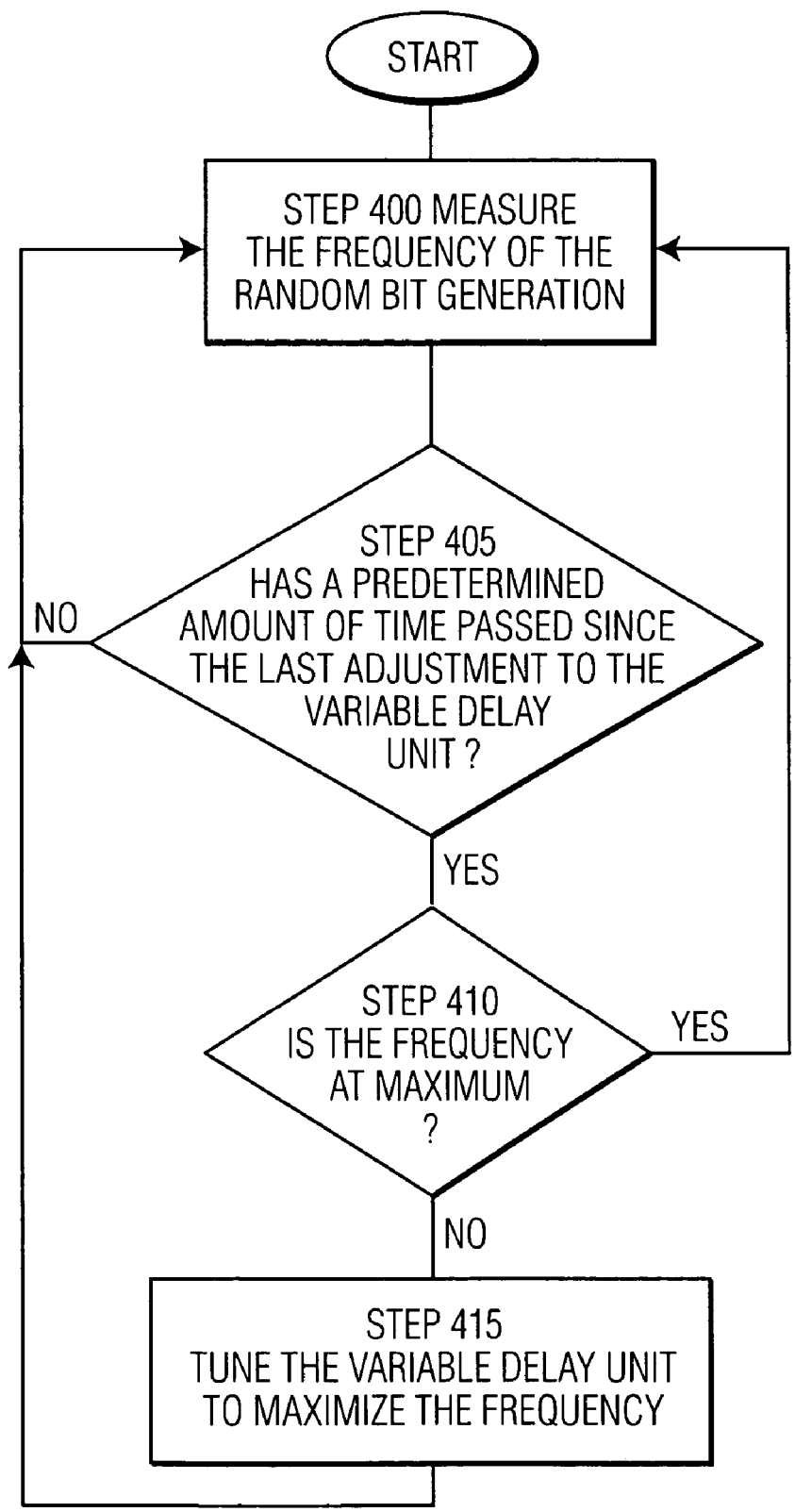
FIG. 4 is a flowchart providing a general overview of one way a method according to the present invention can be performed.

FIG. 4 is a general overview of a method according to the present invention.

At step 400, the frequency of the random bit generator is measured. As previously discussed, this frequency can be measured via a microprocessor, or with hardware such as a counter multiplied with a weight at every clock cycle and incremented each time a random bit is generated.

At step 405 it is determined whether a predetermined amount of time has passed since the last time the variable delay unit (310 shown in FIG. 3) has been tuned. The reason for the predetermined amount of time is to ensure that the generation speed can be reliably determined. A person of ordinary skill in the art also understands that this step could be interchanged with the first step, and no measuring of the frequency could occur until the predetermined threshold of time has passed.

If it is determined that the predetermined threshold of time has not passed, the method reverts to the first step 405. However, if it has been determined that the threshold has passed, at step 410 it is determined whether frequency is at a maximum. If the maximum speed is being maintained, there is no reason to adjust the variable delay element, and step 410 is repeated until it is determined that the measured speed is not the maximum speed.

At step 415, the variable delay is dynamically tuned by a predetermined value to optimize the speed, and the time is reset with regard to how long it has been since the last update of the variable delay unit. The predetermined amount of speed value can be stored in a ring-buffer, queue, table, dynamically updated table, etc. Ideally, it is an updated storage wherein a value can be picked that optimizes the possibility that maximum speed will be reached. The method then reverts to step 400 and the new speed is measured. A queue or table could be updated after the predetermined threshold has been reached regarding the degree of variable delay and the speed of the random bit generation.

There are various modifications to the foregoing invention that could be performed by a person of ordinary skill in the art that would lie within the spirit of the invention and the scope of the appended claims. For example, the type of algorithms used, the language in which the algorithms are written, equivalent logic gates other than NAND gates, variations in code or types of code used, defined weight, etc., etc., are all within the teachings of the instant invention. The arrangement of the variable delay and fixed delay units, and the measurement module could be arranged differently than shown in FIG. 3.

What is claimed is:

1. An apparatus for retaining maximum speed of a flip-flop metastability based random number generator, comprising:
   a fixed delay unit having an input for receiving a common signal from a digital signal generator, said fixed delay unit providing a fixed period of delay to the signal as an output;
   a variable delay unit having an input for receiving the common signal from the digital signal generator, said variable delay unit being tunable to provide a variable delay to the common signal as an output;
   a pair of NAND gates each of which has a first input that receives a respective output of one of fixed delay unit and variable delay unit; an output of a first NAND gate is input to a second NAND gate of the pair of NAND gates, and an output of the second NAND gate is input to the first NAND gate of the pair of gates;
   a frequency measurement and delay tuning module that receives an output of a first NAND gate of the pair of NAND gates, said module checks the frequency of random number bit generation and updates the variable delay unit according to predetermined criteria to tune the variable delay unit so as to maximize the speed of the random bit generation.

2. The apparatus according to claim 1, wherein the frequency measurement made by the frequency measurement and delay tuning module occurs at predetermined intervals.

3. The apparatus according to claim 2, wherein the frequency measurement and delay tuning module comprises a microprocessor.

4. The apparatus according to claim 2, wherein the frequency measurement and delay tuning module comprises a counter that is incremented each time a random bit is produced, and multiplied by a weight (<1) at every clock cycle and according to the following algorithm:
   #define Weight 0.9990234375//1−1/(2<<10)
   Counter=Counter*Weight+IsRandomBitGenerated().

5. The apparatus according to claim 2, wherein the predetermined delay schedule is determined by an algorithm that determines whether the variable delay should be equal, smaller, or larger than a present value.

6. The apparatus according to claim 5, wherein the algorithm comprises the following MATLAB code:

```
qlen = 100;                          % Queue length
dmax = 256;                          % #delay values
dsig = sqrt(dmax);                   % standard deviation of steps
speed = zeros(1, qlen);              % start with speed 0
delay = zeros(1, qlen) + dmax/2;     % start with median delay
i = 1;                               % insertion point in the queue
while 1                              % infinite loop to keep max
                                       speed
   dstep = randn*dsig;               % steps of normal distribution
   dstep = sign(dstep)*ceil(abs(dstep));   % ensure |step| > 0
   [smx, imx] = max(speed);          % last max and its index in
                                       queue
   dmx = delay(imx);
   dly = max(1, min(256, dmx + dstep));   % next try
   spd = GetSpeed(dly);              % set delay, get speed
   delay(i) = dly;                   % store trial results
   speed (i) = spd;
   i = i + 1;                        % move insertion point in
                                       queue if i > qlen, i = 1; end
end.
```

7. The apparatus according to claim 1, wherein delay values and corresponding speed measured by frequency measurement and delay module during a last N number of occurrences are stored in a queue.

8. The apparatus according to claim 1, wherein delay values and corresponding speed measured by frequency measurement and delay module during a last N number of occurrences are stored in a dynamic table.

9. The apparatus according to claim 7, wherein the delay values are a pseudo-random sequence of values having a Gaussian distribution.

10. A computer readable medium comprising the following algorithm of executable instructions, wherein the algorithm is used in tuning a variable delay unit using a frequency measurement and delay tuning module, when the algorithm of executable instructions is executed by a computer performs the following steps of:
    (i) setting a queue length at a predetermined value;
    (ii) setting a predetermined number of delay values;
    (iii) designating a standard deviation (dmax) of steps;
    (iv) starting with speed of 0;
    (vi) setting an insertion point in the queue while keeping an infinite loop at maximum speed;
    (vii) designating a number of steps of normal distribution;
    (viii) ensuring that |step|>0;
    (ix) obtaining a last maximum speed and its index in the queue;
    (x) setting the delay as imax;
    (xi) repeating for next delay value (from 1 to 256);
    (xii) setting delay (dly) and getting speed (spd);
    (xiii) storing trial results of speed and updating a variable delay unit used for random number generation;
    (xiv) moving/increasing insertion point I in the queue by 1;
    (xv) if the insertion point i is > que length, and i=1, then ending the routine;
    (xvi) go to step (xi).

11. A system for retaining maximum speed of flip-flop metastability based random number generation comprising:
    means to receive a common signal from an output of at least one flip-flip;

a fixed delay unit having an input for receiving the common signal from the flip-flop, said fixed delay unit delaying the output of the signal by a fixed period before being output;

a variable delay unit having an input for receiving the common signal from the flip-flop, said variable delay unit being tunable to provide a variable delay to the common signal as an output;

a pair of NAND gates, each of which has a first input that receives a respective output of one of fixed delay unit and variable delay unit; an output of a first NAND gate is input to a second NAND gate of the pair of NAND gates, and an output of the second NAND gate is input to the first NAND gate of the pair of gates;

a frequency measurement and delay tuning module that receives an output of a first NAND gate of the pair of NAND Gates, said module checks the frequency of random number bit generation and updates variable delay unit to according to predetermined criteria to tune the delay so as to maximize the speed of the random bit generation.

12. The system according to claim 11, wherein the frequency measurement made by the frequency measurement and delay tuning module occurs at predetermined intervals.

13. The system according to claim 11, wherein the frequency measurement and delay tuning module comprises a microprocessor.

14. The system according to claim 11, wherein the frequency measurement and delay tuning module performs the following tuning algorithm:
(i) setting a queue length at a predetermined value;
(ii) setting a predetermined number of delay values;
(iii) designating a standard deviation (dmax) of steps;
(iv) starting with speed of 0;
(v) starting with a median delay;
(vi) setting an insertion point in the queue while keeping an infinite loop at maximum speed;
(vii) designating a number of steps of normal distribution;
(viii) ensuring that |step|>0;
(ix) obtaining a last maximum speed and its index in the queue;
(x) setting the delay as imax;
(xi) repeating for next next delay value (from 1 to 256);
(xii) setting delay (dly) and getting speed (spd);
(xiii) storing trial results of speed and updating a variable delay unit used for random number generation;
(xiv) moving/increasing insertion point i in the queue by 1;
(xv) if the insertion point i>que length, and i=1, then ending the routine;
(xvi) go to step (xi).

15. A method for retaining the maximum speed of a flip-flop metastability based random number generator comprising the following steps:

(a) measuring the frequency of random bit generation;
(b) determining whether a predetermined period of time has passed since a previous adjustment of a variable delay unit;
(c) if the predetermined period in step (b) has passed, determining whether the frequency measured in step (a) is at a maximum;
(d) if it has been determined in step (c) that the frequency is at a maximum, reverting to step (a), otherwise, adjusting the variable unit by a predetermined amount according to an algorithm that determines whether the variable delay should be larger, equal to, or smaller than optimum frequency by a predetermined amount based on the frequency measured in step (a);
(e) resetting a timer that measures a predetermined period of time between adjustments of the variable unit, and returning to step (a).

16. The method according to claim 15, wherein the frequency measured in step (a) is performed by a counter and by using the following C code:
define Weight 0.9990234375//1−1/(2<<10)
Counter=Counter*Weight+IsRandomBitGenerated().

17. The method according to claim 15, wherein the determination of maximum frequency in step (c) is made by comparing values in a table.

18. The method according to claim 15, wherein the determination of maximum frequency is step (c) is made by correlating values in a ring-buffer.

19. The method according to claim 15, wherein the algorithm that is used to adjust the variable unit in step (d) comprises the following steps:
(i) setting a queue length at a predetermined value;
(ii) setting a predetermined number of delay values;
(iii) designating a standard deviation (dmax) of steps;
(iv) starting with speed of 0;
(v) starting with a median delay;
(vi) setting an insertion point in the queue while keeping an infinite loop at maximum speed;
(vii) designating a number of steps of normal distribution;
(viii) ensuring that |step|>0;
(ix) obtaining a last maximum speed and its index in the queue;
(x) setting the delay as imax;
(xi) repeating for next next delay value (from 1 to 256);
(xii) setting delay (dly) and getting speed (spd);
(xiii) (xiii) storing trial results of speed and updating a variable delay unit used for random number generation;
(xiv) moving/increasing insertion point i in the queue by 1;
(xv) if the insertion point i>que length, and i=1, then ending the routine;
(xvi) go to step (xi).

* * * * *